United States Patent [19]

van Baardewijk et al.

[11] Patent Number: 4,545,050
[45] Date of Patent: Oct. 1, 1985

[54] METHOD OF AND ARRANGEMENT FOR ESTABLISHING A CONFERENCE CONNECTION IN A TDM COMMUNICATION SYSTEM

[75] Inventors: Johannes van Baardewijk; Nicolaas Bohlmeyer; Johan E. A. Hartman, all of Hilversum, Netherlands

[73] Assignee: U.S. Philips Corporation, New York, N.Y.

[21] Appl. No.: 475,589

[22] Filed: Mar. 15, 1983

[30] Foreign Application Priority Data

Mar. 15, 1982 [NL] Netherlands .......................... 8201058

[51] Int. Cl.[4] ........................................... H04Q 11/04
[52] U.S. Cl. ..................................................... 370/62
[58] Field of Search ...................... 370/62; 179/18 BC

[56] References Cited

U.S. PATENT DOCUMENTS

| | | | |
|---|---|---|---|
| 4,230,908 | 10/1980 | Davis et al. ..................... | 179/18 BC |
| 4,257,120 | 3/1981 | Funderbury et al. .......... | 179/18 BC |
| 4,274,155 | 6/1981 | Funderbury et al. .................. | 370/62 |
| 4,280,216 | 7/1981 | Zeitrag ................................. | 370/62 |
| 4,387,457 | 6/1983 | Münter .......................... | 179/18 BC |
| 4,425,478 | 1/1984 | Van Mil et al. . | |
| 4,430,734 | 2/1984 | Hubbard ............................... | 370/62 |

FOREIGN PATENT DOCUMENTS

| | | |
|---|---|---|
| 2918086 | 12/1979 | Fed. Rep. of Germany . |
| 2905426 | 8/1980 | Fed. Rep. of Germany . |
| 2906269 | 8/1980 | Fed. Rep. of Germany . |
| 56-122567 | 9/1981 | Japan ...................................... 370/62 |

Primary Examiner—Douglas W. Olms
Assistant Examiner—Curtis Kuntz
Attorney, Agent, or Firm—Thomas A. Briody; William J. Streeter; Leroy Eason

[57] ABSTRACT

To establish a conference connection between three participants in a TDM telephony system, use is made of the time-division switching stage which in many cases is already of a duplicated construction. The information signals (a, b, c) from the participants are written into corresponding addresses (AA, BB, CC) of two information memories while these addresses, after having been cyclically permuted, are written into the address memory associated with each of the information memories. When now the locations in the information memories are read in the sequence indicated by the address memories and summed thereafter, then each participant in the conference is supplied with a conference signal which is equal to the sum of the information signals of the two other participants in the conference connection.

11 Claims, 1 Drawing Figure

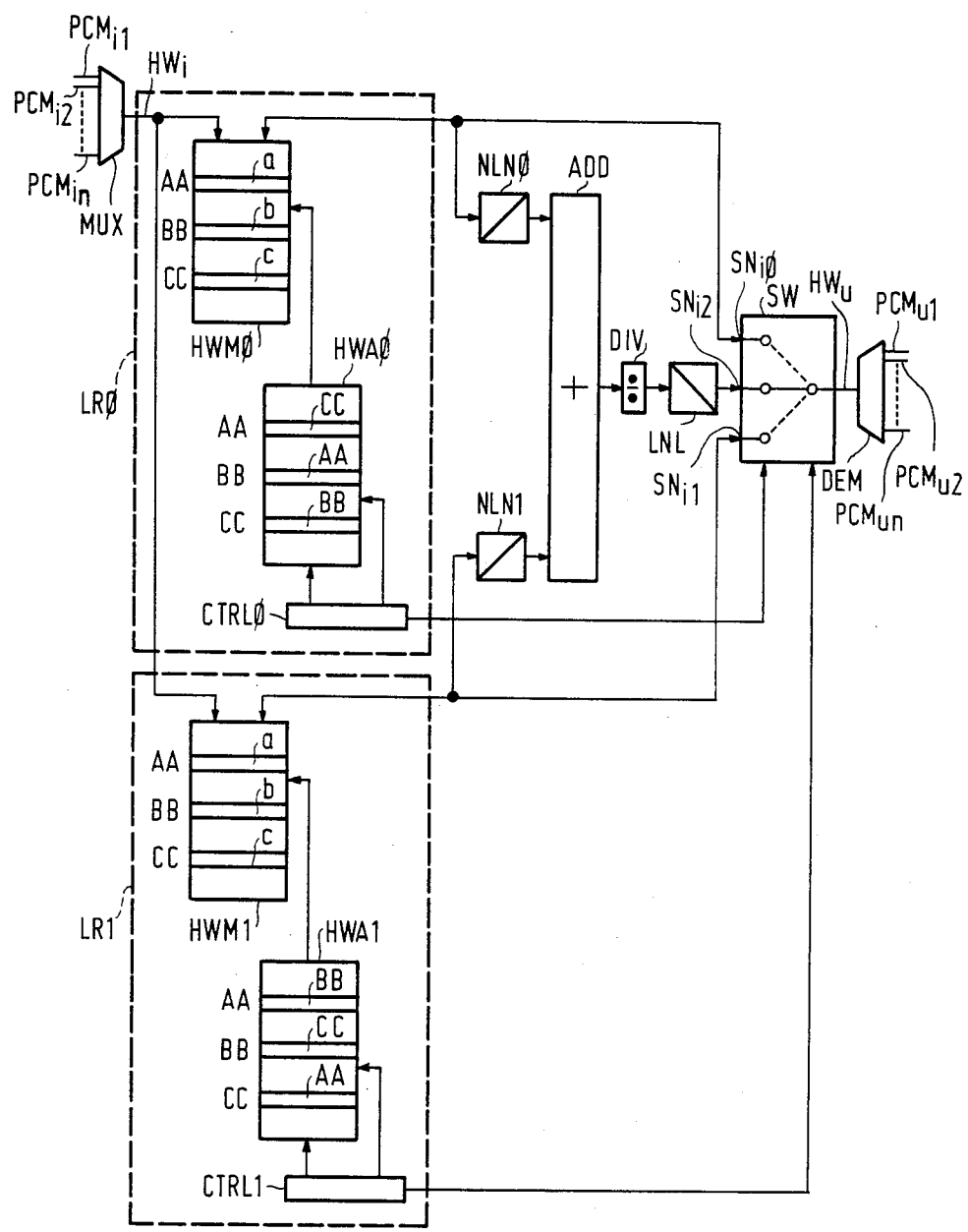

METHOD OF AND ARRANGEMENT FOR ESTABLISHING A CONFERENCE CONNECTION IN A TDM COMMUNICATION SYSTEM

The invention relates to a method of establishing conference connections between three conference participants in a TDM communication network, in which a conference signal comprising the sum of the information signals supplied by the other participants is applied to each of the conference participants.

The invention further relates to an arrangement for establishing conference connections in accordance with the method.

BACKGROUND OF THE INVENTION

In time-division multiplex (TDM) systems the encoded or non-encoded samples of the information (speech) supplied by a subscriber occupy time slots in consecutive frames of time slots. The connection established between two participants (for example via a time switching system or T-switch) results in the information contained in the relevant time slots of the two subscribers being mutually interchanged. If it is desired to establish a connection between three subscribers, a more complicated treatment and processing of the information stored in the (three) time slots per frame is required.

From German Patent Application No. 2918086, which has been laid open to public inspection, it is known to establish a conference connection between three participants by sequentially entering the information (speech samples) of the three subscribers A, B, C into one and the same memory location of a first memory. After the sample from A has been written into the first memory this sample (from A) is entered in the same location in a second memory and the sample from B is written into the first memory. When the sample from C is applied to the first memory the location in which sample B and the location in which sample A has been written is addressed by one addressing memory and the information stored in the first memory (sample from B) is added to the information in the second memory (sample from A) and transmitted in the outgoing time slot of subscriber C. This same cycle is thereafter performed for the subscribers A and B and is repeated thereafter, starting with C.

This method requires that the connection memory (first memory) which must be present in any case must be extended by a similar, additional memory, (second memory) which entails additional expense.

OBJECT OF THE INVENTION

It is an object of the invention to provide a novel concept of a method of establishing conference connections between three conference participants.

SUMMARY OF THE INVENTION

According to the invention, the method of establishing conference connections between three conference participants of the type described in the opening paragraph is characterized in that the information signals (a, b, c) from the participants are written into two equally large information memories at corresponding addresses (AA, BB, CC), that these addresses (AA, BB, CC) are written into two address memories each associated with one of the information memories, that the sequence in which the addresses are stored in one address memory (for example CC, AA, BB) is both cyclically permuted relative to the sequence in which the addresses are stored in the other address memory (BB, CC, AA), and stored in the two information memories (AA, BB, CC), that the information signals stored in the information memories in the corresponding memory locations given by the respective address memories are summed to form a conference signal (c+b, a+c and b+a, respectively) and that the relevant conference signal is applied to that conference participant who corresponds to the instantaneous address of the information memory (AA, BB and CC, respectively).

For reliability reasons large portions of the circuit are usually provided in dual form in communication networks.

It is advantageous for the method in accordance with the invention to be performed such that the information stores and the address memories associated therewith are implemented by co-using the connection memory required for two-way connections, the address memory associated therewith and the duplicate connection memory and the duplicate address memory associated therewith.

This enables a conference connection to be established between three participants virtually without additional means.

It is advantageous for the method in accordance with the invention, the information signals being encoded non-linearly more specifically PCM-coded and the information signals being converted into a linear code prior to the summing operation, to be constructed in such a way that the information signals are divided by two after summation and reconverted to the non-linear code.

According to the invention, the arrangement for establishing conference connections between three conference participants of the type described in the opening paragraph comprising a first and a second, equally large information memory, a first address memory and a summing circuit, the summing circuit being coupled to the two information memories for summing the information read from the address locations in the information memory, is characterized in that the arrangement comprises a second address memory, that the first address memory is associated with the first information memory and the second address memory is associated with the second information memory, that the first and second information memories are connected to an incoming line which in time-division multiplex comprises the information signals from the conference participants, the information signals of the participants being written into the two information memories in corresponding locations and that the arrangement further comprises means for cyclically permuting the address memory locations in which the addresses of the information memory locations from the conference participants are written.

BRIEF DESCRIPTION OF THE DRAWING

An embodiment of the invention and its advantages will now be described in greater detail by way of example with reference to the drawing, the sole FIGURE of which shows an embodiment of an arrangement for establishing a conference connection with reference to which the method in accordance with the invention will be further described.

DETAILED DESCRIPTION OF THE PREFERRED EMBODIMENT

The arrangment shown forms part of a PCM time division switching element by means of which not only conference connections can be established between three subscribers, but also the, more customary, connections between two subscribers. The information supplied by the subscribers is sampled, the samples are encoded (for example PCM-coded) and transmitted in the form of words of, for example, 8 bits within one of the available time slots in a block of, for example, 32 time slots. The other time slots may contain the words supplied by other subscribers. A group of n lines $PCM1_1$, $PCM1_2$, ... $PCM1_n$, each comprising consecutive frames of 32 time slots are connected to a multiplexer MUX for converting these parallel applied frames of time slots into a super frame formed by $n \times 32$ time slots (a typical value of n is 16) on a supermultiplex line $HW_i$. A first and a second information memory $HWM_0$ and $HWM_1$, respectively is connected to the supermultiplex line $HW_i$. The information contained in each time slot is written into one of the memory locations of both information memory $HWM_0$ and $HWM_1$. The number of memory locations comprised in the information memories $HWM_0$ and $HWM_1$ depends on the anticipated number of connections. When the arrangement is only employed for the establishment of conference connections the number of memory locations will be rather small, compared with the number necessary if, simultaneously, connections between two participants must be established.

The outputs of the information memories $HWM_0$ and $HWM_1$, respectively are connected to both the input of a code converter $NLN_0$ and $NLN_1$, respectively and to an input $SN_{i0}$ and $SN_{i1}$, respectively of a switch SW. The outputs of code converters $NLN_0$ and $NLN_1$ are each connected to an input of a summing circuit ADD. The code converters $NLN_0$ and $NLN_1$ have for their object to convert the PCM words which were here assumed to have been nonlinearly encoded into linearly encoded words.

A dividing circuit DIV still to be described hereinafter is connected to an output of the summing circuit ADD. A reconverter LNL which has for its object to reconvert the now linearly encoded words into non-linearly encoded PCM words is connected to the dividing circuit DIV. The output of the reconverter LNL is connected via switch SW to an outgoing supermultiplex line $HW_u$, which is connected to a demultiplexer DEM for converting the information stream on super multiplex line $HW_u$ into n parallel information streams on the outgoing PCM-multiplex lines $PCM_{u1}$, $PCM_{u2}$, ... $PCM_{un}$.

For the control of information memories $HWM_0$ and $HWM_1$ the arrangement comprises address memories $HWA_0$ and $HWA_1$, which also acts as address converters as will be described below. $HWA_0$ and $HWA_1$ are, in turn, controlled by control circuit $CTRL_0$ and $CTRL_1$, respectively. Each address memory $HWA_0$ and $HWA_1$ has at least as many storage locations as there are time slots in one super frame on the incoming supermultiplex line $HW_1$. (Consequently 512 memory locations if 16 PCM-lines having frames of 32 time slots each are connected to the multiplexer MUX).

The arrangement shown operates as follows. Let it be assumed that a conference connection must be established between three conference participants A, B and C. The PCM words of these participants are transmitted in the time slots TA, TB and TC and are also written into the address AA, BB and CC, respectively of the information memories $HWM_0$ and $HWM_1$. The information a from participant A, the information b from participant B and the information c from participant C are consequently present, after the entire superframe has been entered in both the information memory $HWM_0$ and in information memory $HWM_1$. At corresponding addresses (AA, BB and CC) in the address memories $HWA_0$ and $HWA_1$ the address is entered of that memory location in the information memories $HWM_0$ and $HWM_1$ which contains information intended for the relevant participant. Since a connection between three participants must be established and the said memory location in the information memory only contains the information from one other participant, this is inadequate. Consequently, the addresses of the memory locations of the information memories are written after having been cyclically permuted, into the address memories $HWA_0$ and $HWA_1$; more specifically in such a way that at the addresses AA, BB and CC of address memories $HWA_0$ the information memory addresses CC, AA and BB respectively are written and that at the addresses AA, BB and CC of address memory $HWA_1$ the information memory addresses BB, CC and AA, respectively are written. This accomplishes that on addressing of information memory $HWM_0$ via the address stored at the address AA of address memory $HWA_0$, namely information memory address CC, the information c is read and, after having been converted into a linear code by code converter $NLN_0$, transmitted to the input of the summing circuit ADD. Simultaneously, the information memory $HWM_1$ is addressed via the address stored at the same address (AA) of the address memory $HWA_0$, namely information memory address BB, and the information stored there (b) is read and transmitted to the summing circuit ADD via code converter $NLN_1$. These items of information b, c are added together (b+c), divided thereafter by 2 by means of the dividing circuit DIV connected to the summing circuit and reconverted into the non-linear PCM code used. Under the control of the control circuits $CTRL_0$ and $CTRL_1$, switch SW is adjusted to the position shown in the drawing and the conference signal (b+c/2) is transmitted in time slot TA (as address memory location AA has been addressed) on the outgoing supermultiplex line $HW_u$.

For the two further participants in the conference a similar procedure is carried out. When the address BB of address memory $HWA_0$, ($HWA_1$) is addressed, the information a(c) stored at address AA (CC) of the information memory $HWM_0$($HWM_1$) is read and the conference signal (a+b/2) is transmitted in time slot TB on the outgoing supermultiplex line $HW_u$ to participant B. Likewise, when the address CC of address memory $HWA_0$ ($HWA_1$) is addressed the information b(a) is present at address BB (AA) to be read from the information memory $HWM_0$ ($HWM_1$) as a result of which the conference signal (b+a/2) is transmitted in time slot TC on the outgoing supermultiplex line $HW_u$ to participant C.

If the arrangement shown is also employed to establish connections between two participants, then only one information memory (for example $HWM_0$) and one address memory (for example $HWA_0$) are required in principle. Under the control of the control circuit (for example $CTRL_0$) switch SW is adjusted to one of two possible positions, shown in the FIGURE by means of broken lines, (for example input $SW_{i0}$ is switched to the supermultiplex line $HU_u$).

For reliability reasons large portions of the communication equipment are often duplicated. Thus a time-division multiplex system arranged in switch connections between two participants will generally still be constructed in duplicate and will, consequently consist of two identical units $LR_0$ and $LR_1$. These units are also operated in parallel and switch SW is then adjusted to one of the two positions shown in the FIGURE by means of dotted lines, under the control of two control circuits $CTRL_0$ and $CTRL_1$. Which position will be selected depends inter alia on the occurrence of parity errors or other errors in one of the two units $LR_0$ or $LR_1$.

If such a duplicate time-division multiplex system is provided, it is possible to obtain with few additional means an arrangement with which connections can also be established between three participants.

It is further possible, if these additional means are provided, to make advantageous use of the additional means also for "normal" connections (connections between two subscribers). In that event switch SW is strictly speaking superfluous. The information (b) for subscriber A originating from subscriber B is stored in information memories $HWM_0$ and $HWM_1$ and, after having been read and added together (b+b) can be divided by 2 in dividing circuit DIV, as a result of which the information b is transmitted to subscriber A in time slot A on the outgoing supermultiplex line $HU_u$.

Whether the converter ($NLN_i$), the reconverter (LNL), the summing circuit (ADD) and the dividing circuit (DIV) operate properly can be checked by comparing during two-way communications, for example the parity of the information signal obtained by conversion, addition, division and reconversion with the parity of the information signal previously stored in the information memories $HWM_0$ and $HWM_1$. These two signals are identical if the processing of the first-mentioned, the outgoing, information signal was errorless.

What is claimed is:

1. A method for establishing conference connections among three conference participants in a TDM communication network in which a conference signal comprising the sum of the information signals supplied by the other conference participants is supplied to each of the conference participants, and in which the information signals are encoded in non-linear PCM form, characterized in that:
   the information signals (a, b, c) from the participants are written into two information memories at corresponding addresses (AA, BB, CC);
   the addresses (AA, BB, CC) are written into two address memories each associated with one of the information memories, the sequence in which the addresses are stored in one address memory (for example CC, AA, BB) being cyclically permuted relative to the sequence in which the addresses are stored in the other address memory (BB, CC, AA) and further relative to the sequence in which the information is stored in the two information memories (AA, BB, CC);
   the information signals being stored in corresponding locations in the information memories specified by the respective address memories, and being summed to form a conference signal (c+b, a=C and b+a, respectively), the information signals being converted to a linear code prior to being summed;
   dividing the conference signals by two after summation and thereafter reconverting them into non-linear PCM form;
   and supplying the relevant reconverted conference signal to that conference participant who corresponds to the instantaneous address applied to said address memories (AA, BB and CC respectively).

2. A method of establishing a conference connection as claimed in claim 1, characterized in that the information memories and the address memories associated therewith are implemented by co-using the connection memory required for two-way connections, the address memory associated therewith and the duplicate connection memory and the duplicate address memory associated therewith.

3. A method for establishing a conference connection as claimed in claim 1, characterized in that the information signals are compared with the conference signal, that in the event that there is a connection between only two participants it is determined from the agreement between the two signals or from the lack of agreement whether the conference connection for three participants operates correctly or does not operate correctly, and that in the event that there is a connection between only two participants and only one of the two information signals is in agreement with the conference signal said last-mentioned information signal is chosen as the conference signal.

4. A method for establishing conference connections among a first, second, and third participant respectively furnishing a first, second and third information signal so that a first, second and third conference signal comprising the sum of the information signal supplied by the other conference participants is transmitted, respectively, to said first, second and third participant, said information signals being nonlinearly encoded, comprising the steps of
   entering each of said information signals into corresponding storage locations in a first and second set of memory locations, so that a first, second and third pair of storage locations stores said first, second and third information signal, respectively, said pairs of storage locations having, respectively, a first, second and third participant-associated address;
   generating said first participant associated address;
   converting the so-generated first participant-associated address to said second participant-associated address and said third participant-associated address for said first and second set of memory locations, respectively, thereby automatically reading out said second and third information signals;
   linearizing the two so read-out signals and summing said linearized signals, thereby creating a sum signal; and
   transmitting said sum signal to said first participant under control of said first participant-associated address.

5. A method as set forth in claim 4, further comprising the steps of repeating said address generating, converting, summing and transmitting steps, in turn, for said second and third participant.

6. A method as set forth in claim 4, further comprising the step of dividing said sum signal by two prior to said transmitting step.

7. A method as set forth in claim 6, further comprising the step of testing said communications network.

8. A method as set forth in claim 7, wherein said testing step comprises operating said network between said first and second participant only, whereby said step of address converting comprises converting said first participant-associated address to said second participant-associated address for both said first and second set of memory locations, thereby automatically reading out said second information signal from both said sets, and wherein said testing step further comprises linearizing each of said so read-out information signals, adding the so-linearized signals thereby creating a sum signal, code converting said sum signal to create a compressed sum signal, dividing said compressed sum signal by two and comparing the so divided signal to said second information signal.

9. Apparatus for establishing a conference connection among a plurality of participants generating respective information signals, comprising, in combination, at least first and second memory means each for storing all of said information signals from said participants at respective participant-associated addresses;

means for generating said participant-associated addresses;

first and second address converting means connected to said participant-associatedd address generating means and, respectively, to said first and second memory means, both receiving each of said participant-associated addresses substantially simultaneously, each for converting the so-received address to another of said participant-associated addresses different from each other and different from said so-received address and applying the so-converted address to the respective one of said memory means, whereby information signals from the others of said participants are read out substantially simultaneously in response to each of said so-received addresses;

code converter means connected to said first and second memory means for linearizing said read-out information signals;

summing means connected to said code converter means for summing said linearized signals, thereby creating sum signals;

reconverting means connected to said summing means to receive said sum signals and furnish compressed sum signals corresponding thereto; and means connected to said participant-associated address signal generating means and said reconverting means for transmitting said compressed sum signals to said participants under control of said participant-associated addresses.

10. Apparatus as set forth in claim 9, wherein said first and second memory means comprises a first and second memory having the same number of storage locations.

11. Apparatus as set forth in claim 10, wherein said first and second address converting means comprises, respectively, a first and second address memory having, respectively, first and second corresponding address memory locations addressable by said participant-associated addresses, each pair of said corresponding address memory locations storing a first and second other of said participant-associated addresses.

* * * * *